July 15, 1924.
T. C. CAMPBELL
SHAFT COUPLING
Filed Sept. 2, 1921
1,501,647
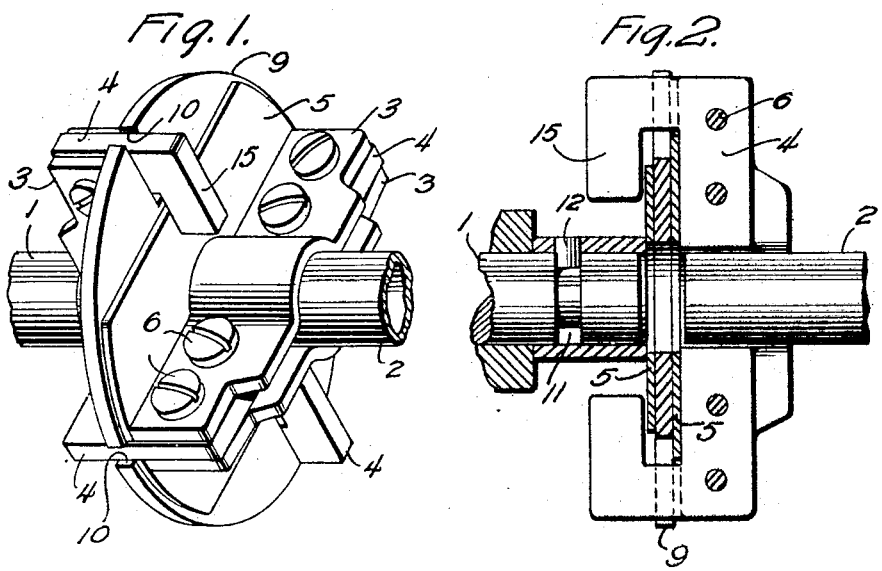
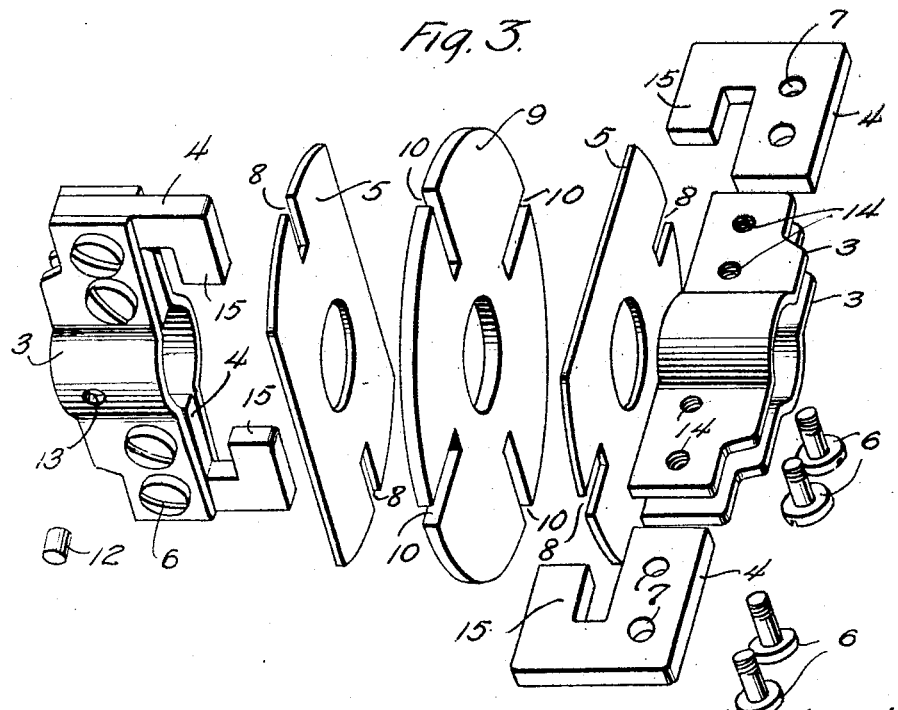
Inventor:
Thaddeus C. Campbell,
by W. E. Beatty, Atty.

Patented July 15, 1924.

1,501,647

UNITED STATES PATENT OFFICE.

THADDEUS C. CAMPBELL, OF RUTHERFORD, NEW JERSEY, ASSIGNOR TO WESTERN ELECTRIC COMPANY, INCORPORATED, OF NEW YORK, N. Y., A CORPORATION OF NEW YORK.

SHAFT COUPLING.

Application filed September 2, 1921. Serial No. 497,852.

*To all whom it may concern:*

Be it known that I, THADDEUS C. CAMPBELL, a citizen of the United States, residing at Rutherford, in the county of Bergen, State of New Jersey, have invented certain new and useful Improvements in Shaft Couplings, of which the following is a full, clear, concise, and exact description.

This invention relates to shaft couplings and is directed particularly to a coupling designed to facilitate the joining of rotating shafts which may be unaligned.

One object of the invention is the provision of a coupling of the above character which may be readily put on and taken off the shafts without separating or otherwise disturbing the latter. Another object is the provision of a coupling requiring a minimum of machining operations and which is, consequently, inexpensive to manufacture.

In accordance with the above mentioned objects, one of the features of the present invention consists in the provision of a coupling made almost entirely of punched sheet metal parts, and, further, in the provision of such a coupling in which the shaft carried elements are clamped to the shafts and are removable laterally therefrom.

In its preferred form, the invention comprises two shaft carried elements and an intermediate member as, for instance, a plate provided with radially extending peripheral slots which are engaged by the shaft carried elements. The intermediate member connects the two shaft carried elements and permits of their being relatively displaced, that is, it permits the two shafts which are coupled together to operate even though they are unaligned. Each of the shaft carried elements comprises a pair of clamping straps which are preferably punched from sheet metal and suitably bent and a pair of U-shaped shaft members also preferably of punched sheet metal which are gripped between the clamping straps. In the assembled coupling the U-shaped members each engage one of the peripheral slots in the intermediate member and are adapted to slide radially therein. As will be pointed out more clearly in the detailed description hereinafter, the U-shaped members are held only between the outer edges of the clamping straps, and consequently, they would be likely to assume such positions that they would bind in the slots of the intermediate member in which they slide, but for the fact that means are provided for holding them firmly in their proper positions. This last mentioned means comprises a slotted member, preferably a plate, the slots therein being so disposed and of such width that they firmly engage the U-shaped members holding them in proper alignment.

The invention, then, is characterized in that all the principal parts of the coupling consists of punched sheet metal parts, no castings being employed, and is further characterized in the details of construction with respect to the manner in which the U-shaped members are held in alignment, whereby a very economical structure is provided.

Referring now to the drawing Fig. 1 is a perspective assembly view of a coupling in accordance with this invention; Fig. 2 is a sectional view of an assembled coupling taken along the axes of the coupled shafts; and Fig. 3 is a detached perspective view showing the elements of the coupling in detail.

Referring particularly to Fig. 3, it will be seen that all the parts of the coupling with the exception of the screws 6 and pin 12 are of punched sheet metal and therefore are very inexpensive to manufacture. These parts consist of the clamping straps 3, the U-shaped members 4, the aligning plates 5 and the intermediate member 9.

A pair of clamping straps 3 and a pair of U-shaped members 4 assembled as shown at the extreme left of Fig. 3 together with one aligning plate 5 constitute what is referred to herein as a shaft carried element. A complete coupling comprises two such shaft carried elements and an intermediate member 9. The U-shaped members 4 are inserted between the clamping straps 3 and the latter are clamped to the end portions of the shaft by means of the screws 6 which pass through the apertures 7 in the U-shaped members 4 and engage the threads in the apertures 14 of one of the clamping straps. The clamping straps are so designed that only their outermost edges bear on the U-shaped members 4 in order that they may properly grasp the shaft. This point is most clearly illustrated in the partial assembly view of the shaft carried element at the left of Fig. 3.

The U-shaped members 4 as is illustrated in Fig. 1, each engage one of the slots 10 in the intermediate member 9 and should the shafts 1 and 2 be out of alignment, said U-shaped members reciprocate radially in the slots 10 during rotation of the shafts.

Now it is evident that with the arrangement shown and described, the U-shaped members 4 would be likely to position themselves more or less diagonally of the slots 10 and would tend to bind therein, but for the fact that the aligning plates 5 are provided to preclude any such condition. These last mentioned plates each have a pair of oppositely disposed slots 8 into which the U-shaped members 4 fit closely and are held firmly in alignment.

The plate 5 not only serves to hold the U-shaped members in alignment, but it also acts as a thrust bearing in cooperation with the intermediate member 9 and provides a large bearing area, it being understood, of course, that there is a relative lateral movement between the plates 5 and the intermediate member 9 and between the lugs 15 of the shaft members and the member 9 where the shafts 1 and 2 are out of alignment. The plates 5 are preferably made of bronze or other metal having self lubricating qualities.

If desired one or both of the shafts may be provided with an annular groove, such as 11, shown on shaft 1 in Fig. 2, and pins, such as 12, may be driven into apertures 13 in one or more of the clamping straps 3 to engage the annular groove or grooves to locate the coupling with respect to the shafts. The inwardly projecting lugs 15 on the U-shaped members 4 serve to prevent separation of the coupling, should there be any tendency for the shafts 1 and 2 to separate. These lugs 15 may be eliminated where it is not necessary nor desirable to provide means to prevent relative longitudinal movement of the shafts.

What is claimed is:

1. A shaft coupling comprising an intermediate plate having radially extending slots and two shaft carried elements slidably engaging the slots of said intermediate plate, said shaft carried elements each comprising a pair of oppositely disposed members, clamping means for securing said members and for attaching said shaft carried element to its respective shaft and independent means for aligning said members.

2. A shaft coupling comprising a pair of shaft carried elements and an intermediate plate for connecting said elements, said intermediate plate being provided with four evenly spaced radially extending peripheral slots, each of said shaft carried elements comprising a pair of members each of which slidably engages one of said slots in said intermediate plate, a pair of clamping straps for attaching to a shaft and an aligning plate having a pair of oppositely disposed peripheral slots, said members being secured between said clamping straps and each engaged by one of the slots in said aligning plate whereby it is held in proper relation to the slot which it engages in said intermediate plate.

3. A shaft coupling comprising an intermediate plate having radially extending slots and two shaft carried elements slidably engaging the slots of said intermediate plate, said shaft carried elements each comprising a pair of oppositely disposed U-shaped members, clamping means embracing one arm of each of said U-shaped members and the end of one of said shafts for attaching said members to said shaft and means for aligning said U-shaped members.

4. A shaft coupling comprising an intermediate plate having radially extending slots and two shafts carried elements slidably engaging the slots of said intermediate plate, said shaft carried elements each comprising a pair of oppositely disposed U-shaped members, and clamping means embracing one arm of each of said U-shaped members and the end of one of said shafts for attaching said members to said shaft, the free arms of said members extending through the slots of said plates and overlying the opposite face thereof.

5. A shaft coupling comprising an intermediate plate having radially extending slots, two shaft carried elements slidably engaging the slots of said intermediate plate, said shaft carried elements each comprising a pair of oppositely disposed members, clamping means embracing one arm of each of said members and the end of one of said shafts for attaching said members to said shaft, the free arms of said members extending through the slots of said plate and overlying the opposite face thereof, and a self lubricating bearing plate interposed between said intermediate plate and the fixed arms of said members.

6. A shaft coupling comprising an intermediate plate having radially extending slots, two shaft carried elements slidably engaging the slots of said intermediate plate, said shaft carried elements each comprising a pair of oppositely disposed U-shaped members, clamping means embracing one arm of each of said U-shaped members and the end of one of said shafts for attaching said members to said shaft, the free arms of said members extending through the slots of said plate and overlying the opposite face thereof and a slotted bearing plate embracing said U-shaped members and interposed between said intermediate plate and said members.

7. A shaft coupling comprising an intermediate plate having radially extending slots, two shaft carried elements slidably engaging the slots of said intermediate plate, said shaft carried elements each comprising a pair of oppositely disposed U-shaped members, clamping means embracing one arm of each of said U-shaped members and the end of one of said shafts for attaching said members to said shaft, the free arms of said members extending through the slots of said plate and overlying the opposite face thereof and a slotted bearing plate embracing said U-shaped members and interposed between said intermediate plate and said members for aligning said members.

8. A shaft coupling comprising an intermediate plate having radially extending slots and two shaft carried elements slidably engaging the slots of said intermediate plate, said shaft carried elements each comprising a pair of oppositely disposed U-shaped members, clamping means embracing one arm of each of said U-shaped members and the end of one of said shafts for attaching said members to said shaft and a slotted bearing plate embracing said U-shaped members and interposed between said intermediate plate and said members.

In witness whereof, I hereunto subscribe my name this 30th day of August, A. D., 1921.

THADDEUS C. CAMPBELL.